(12) United States Patent
Krishnamurthi et al.

(10) Patent No.: US 9,906,066 B2
(45) Date of Patent: Feb. 27, 2018

(54) VISOR-MOUNTABLE WIRELESS CHARGER AND METHOD OF WIRELESS CHARGING

(71) Applicant: MOTOROLA SOLUTIONS, INC., Schaumburg, IL (US)

(72) Inventors: Macwien Krishnamurthi, Shah Alam (MY); Mohd Hisham Muddin Che At, Bandar Baharu (MY); Kow Chee Chong, Kedah (MY); William Kiger, Hoschton, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 254 days.

(21) Appl. No.: 14/685,203

(22) Filed: Apr. 13, 2015

(65) Prior Publication Data

US 2016/0301236 A1  Oct. 13, 2016

(51) Int. Cl.
*H02J 7/00* (2006.01)
*H02J 7/02* (2016.01)
(Continued)

(52) U.S. Cl.
CPC .............. *H02J 7/025* (2013.01); *H02J 5/005* (2013.01); *H02J 50/00* (2016.02); *H02J 50/12* (2016.02);
(Continued)

(58) Field of Classification Search
CPC ....... H02J 2007/0062; H02J 2007/0096; H02J 7/025; H02J 5/005; H02J 50/00; H02J 50/50
(Continued)

(56) References Cited

U.S. PATENT DOCUMENTS

| 7,320,492 B1* | 1/2008 | Rosenbaum ........... B60J 3/0208 296/97.1 |
| 2005/0007067 A1* | 1/2005 | Baarman ................... H01F 5/02 320/108 |

(Continued)

FOREIGN PATENT DOCUMENTS

JP        S6393173 A    4/1988

OTHER PUBLICATIONS

Kesler, Dr. Morris, "WiTricity Highly Resonant Wireless Power Transfer: Safe, Efficient, and over Distance" (2013).
(Continued)

*Primary Examiner* — Nathaniel Pelton
(74) *Attorney, Agent, or Firm* — Michael Best & Friedrich LLP (57) ABSTRACT

A method and apparatus for wirelessly charging a chargeable device, such as a smart phone, digital music player, or navigation device, using a wireless charger. The wireless charger includes a connector, a retainer, and a wireless power transmitter. The connector is configured to secure the wireless charger to a visor in a passenger compartment of a vehicle. The retainer is configured to selectively retain a chargeable device having a recipient coil. The wireless power transmitter includes a charging coil configured to carry a fluctuating electric current that generates a changing magnetic field for receipt by a recipient coil of the chargeable device. The changing magnetic field induces a fluctuating electric current in the recipient coil, which is used to charge a battery pack of the chargeable device.

17 Claims, 11 Drawing Sheets

(51) Int. Cl.
*H02J 5/00* (2016.01)
*H02J 50/50* (2016.01)
*H02J 50/00* (2016.01)
*H02J 50/12* (2016.01)

(52) U.S. Cl.
CPC ....... *H02J 50/50* (2016.02); *H02J 2007/0062* (2013.01); *H02J 2007/0096* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2006/0181893 | A1* | 8/2006 | Fernandez | B60J 3/0282 362/494 |
| 2008/0079388 | A1* | 4/2008 | Sarnowsky | H02J 7/0042 320/103 |
| 2009/0082835 | A1* | 3/2009 | Jaax | H02J 7/025 607/61 |
| 2012/0019057 | A9 | 1/2012 | Kirby et al. | |
| 2012/0200110 | A1* | 8/2012 | Klarr | B60J 3/0204 296/97.5 |
| 2013/0249482 | A1* | 9/2013 | Iwanaga | B60L 11/182 320/108 |
| 2015/0229134 | A1* | 8/2015 | Masaoka | H02J 17/00 307/104 |
| 2015/0270719 | A1* | 9/2015 | Kurs | H02J 5/005 320/108 |
| 2015/0340905 | A1* | 11/2015 | Chen | B60J 3/0278 320/108 |
| 2015/0380970 | A1* | 12/2015 | Vu | H02J 7/025 320/108 |
| 2016/0006484 | A1* | 1/2016 | Swaans | H04B 5/0037 307/104 |
| 2016/0094051 | A1* | 3/2016 | Soar | H02J 5/005 307/9.1 |
| 2016/0264044 | A1* | 9/2016 | Hill | B60Q 3/0269 |

OTHER PUBLICATIONS

The Wireless Power Consortium, "Magnetic Resonance and Magnetic Induction", http://www.wirelesspowerconsortium.com/technology/magnetic-resonance-and-magnetic-induction-making-the-right-choice-for-your-application.html (published at least as early as Feb. 16, 2015).

* cited by examiner

VISOR-MOUNTABLE WIRELESS CHARGER AND METHOD OF WIRELESS CHARGING

BACKGROUND OF THE INVENTION

A wide variety of battery-powered user devices are available, for example mobile phones, global positioning satellite (GPS) navigation systems, tablets, laptops, and wireless headsets. The portability offered by battery-powered devices is advantageous in many scenarios. However, a drawback of battery-powered devices is the frequent need to recharge the battery so that the devices can continue to be used. This problem is exacerbated in situations where limited outlets and space are available for charging a number of devices simultaneously. For example, a taxicab driver may have a mobile phone, global positioning satellite (GPS) navigation system, wireless headset (for use, for example, with a cell phone), and other computer equipment for receiving and handling requests for rider pickup and payment. The devices compete for charging outlets (e.g., cigarette lighter adapter receptacles or universal serial bus (USB) ports). In addition, the charging cables connecting the device to the charging outlets can became tangled. The tangled wires may interfere with the driver's ability to operate the vehicle and create a disorganized appearance.

Accordingly, there is a need for improved methods and devices for in-vehicle charging of batteries and battery-powered devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a wireless charger including a connector that secures the wireless charger to a visor, a retainer that selectively retains a chargeable device, and a wireless power transmitter. The connector is configured to secure the wireless charger to a visor of passenger compartment of a vehicle. The device retainer is configured to selectively retain a chargeable device with respect to the visor and has a recipient coil. The wireless power transmitter includes a charging coil configured to carry a fluctuating electric current that generates a changing magnetic field for receipt by a recipient coil of the chargeable device.

Some embodiments of the invention include a method of wireless charging. The method includes attaching a wireless charger to a visor of a passenger compartment of a vehicle via a connector, and securing a chargeable device to a retainer of the wireless charger, thereby securing the chargeable device to the visor. The method further includes driving a charging coil with fluctuating electric current to thereby generate a changing magnetic field. The changing magnetic field induces a charging current in a recipient coil of the chargeable device. The chargeable device is then charged using the charging current.

Figure 1:
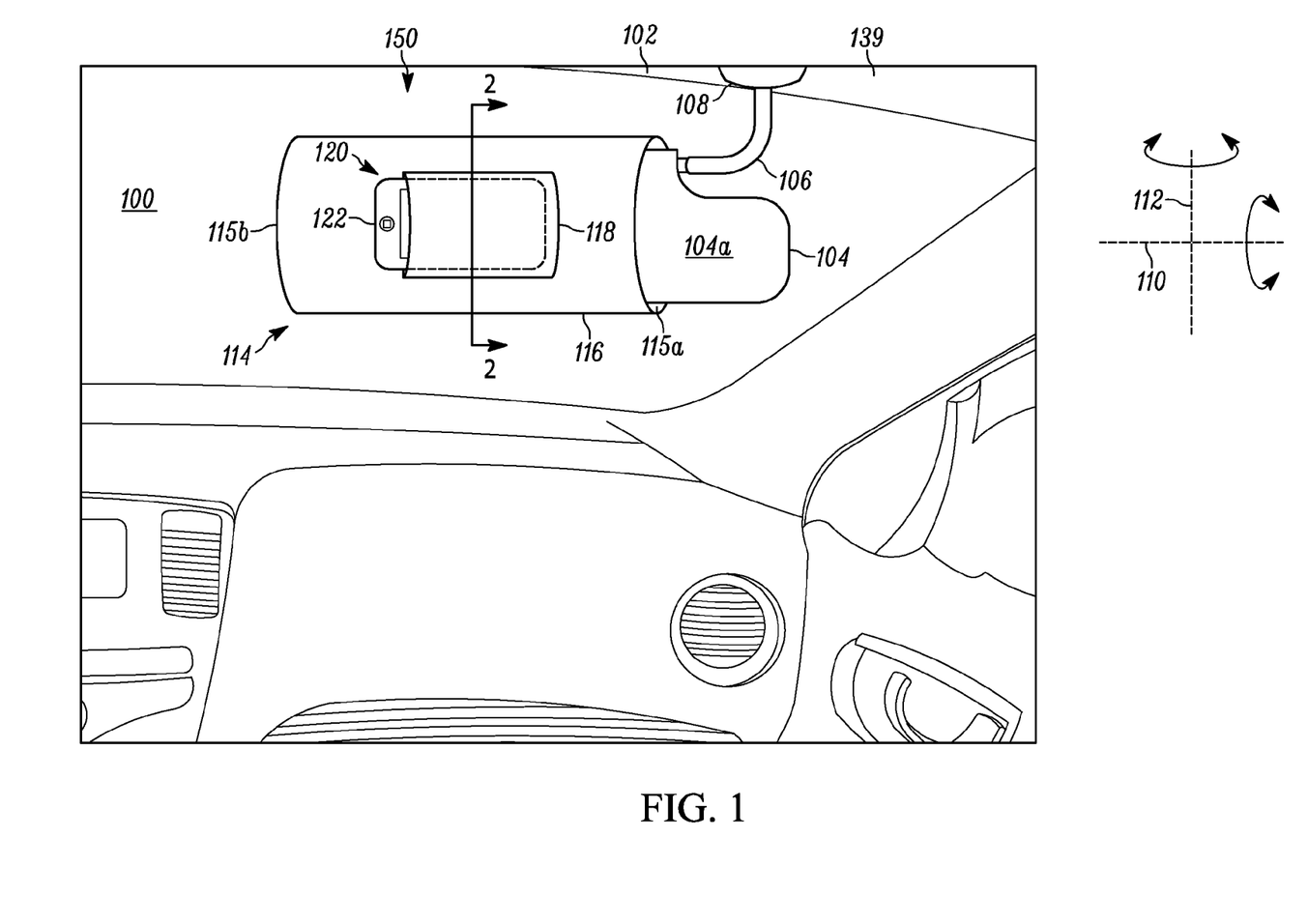
FIG. 1 illustrates a passenger compartment of a vehicle including a wireless charging system in accordance with some embodiments.

FIG. 1 illustrates a passenger compartment 100 of a motor vehicle 102 including a driver-side (left side) and a passenger side (right side). Within the passenger compartment 100 is a visor 104 on the passenger side. The visor 104 has a first side 104*a*. While the description herein focuses on the visor 104 of the passenger side (for illustrative purposes), the description is similarly applicable to the driver-side visor.

The visor 104 is connected to the vehicle 102 via an arm 106. The arm 106 is pivotably coupled to the vehicle 102 via a mounting portion 108. The arm 106 and mounting portion 108 allow two axes of rotation for the visor 104: rotation about a first axis 110 and a second axis 112.

Also illustrated in FIG. 1 is a wireless charger 114. The wireless charger 114 includes a sleeve 116 having an open end 115*a* and a closed end 115*b*. The sleeve 116 may be made of an elastic material that can stretch as a user slides the sleeve 116 over the visor 104, and then constrict to more tightly fit on the visor 104. Broadly speaking, the sleeve 116 connects, attaches, or secures the wireless charger 114 to the visor 104 and, in the context of embodiments of the invention, may be considered to be a connector. Other connectors may be used to secure the wireless charger 114 to the visor 104.

In the embodiment illustrated, the sleeve includes a pocket 118 (which, generically, is a retainer or a device retainer). The pocket 118 includes an opening 120 to receive a chargeable device 122. The chargeable device 122 may be, for example, a smart phone, a GPS navigation device, a digital music player, a tablet, a gaming device, or a battery pack (independent of the device it powers). The pocket 118 retains the chargeable device 122 such that the chargeable device 122 is selectively and temporarily fixed to the sleeve 116 and, therefore, the retained with respect to the visor 104.

Figure 2:
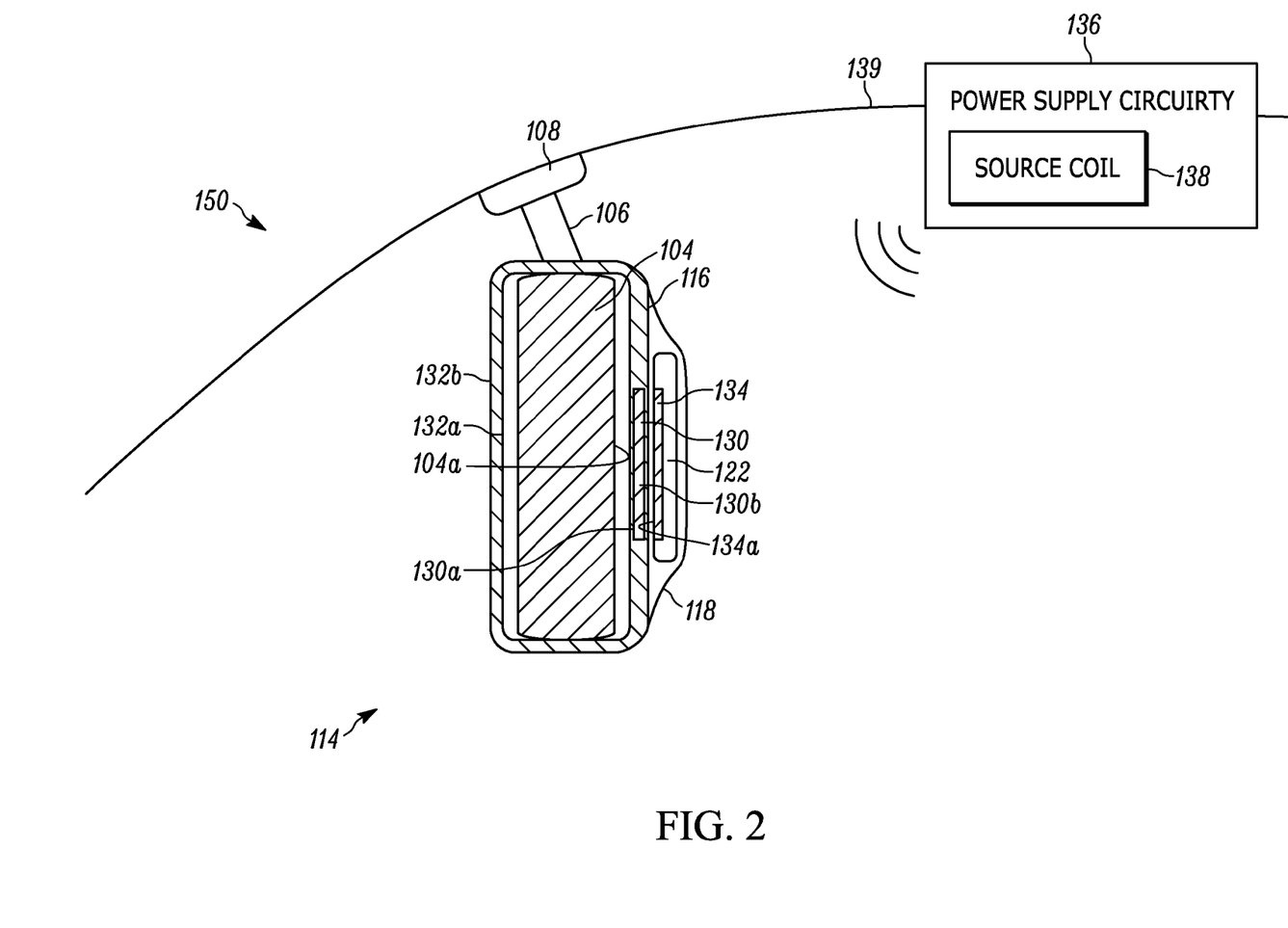
FIG. 2 illustrates a wireless charger in accordance with some embodiments.

FIG. 2 illustrates a cross-section of the visor 104 and wireless charger 114. The wireless charger 114 includes a repeater coil 130 located between an inner layer 132a and an outer layer 132b of the sleeve 116. Additionally, the chargeable device 122 includes a device (recipient) coil 134. As illustrated, the pocket 118 is positioned such that the device coil 134 is positioned adjacent the repeater coil 130. Additionally, the vehicle 102 includes power supply circuitry 136 including a source coil 138, which is shown mounted on a roof 139 of the vehicle 102.

The repeater coil 130 and the device coil 134 are flatwound coils with a generally planar form. Accordingly, the repeater coil 130 and the device coil 134 each have a first and second planar side. For example, the repeater coil 130 includes a first planar side 130a facing the first side 104a of the visor 104 and a second planar side 130b facing away from the visor 104 and toward the pocket 118 and the chargeable device 122. Additionally, the device coil 134 includes a first planar side 134a facing the second planar side 130b of the repeater coil 130, and a second planar side 134b facing away from the visor 104.

As will be described in greater detail below, the source coil 138 transmits power wirelessly to the repeater coil 130, which repeats the signal to transmit power wirelessly to the device coil 134. The chargeable device 122 uses the power received via the device coil 134 to charge a battery of the chargeable device 122. The repeater coil 130 may be referred to as a wireless power transmitter.

Figure 3A:
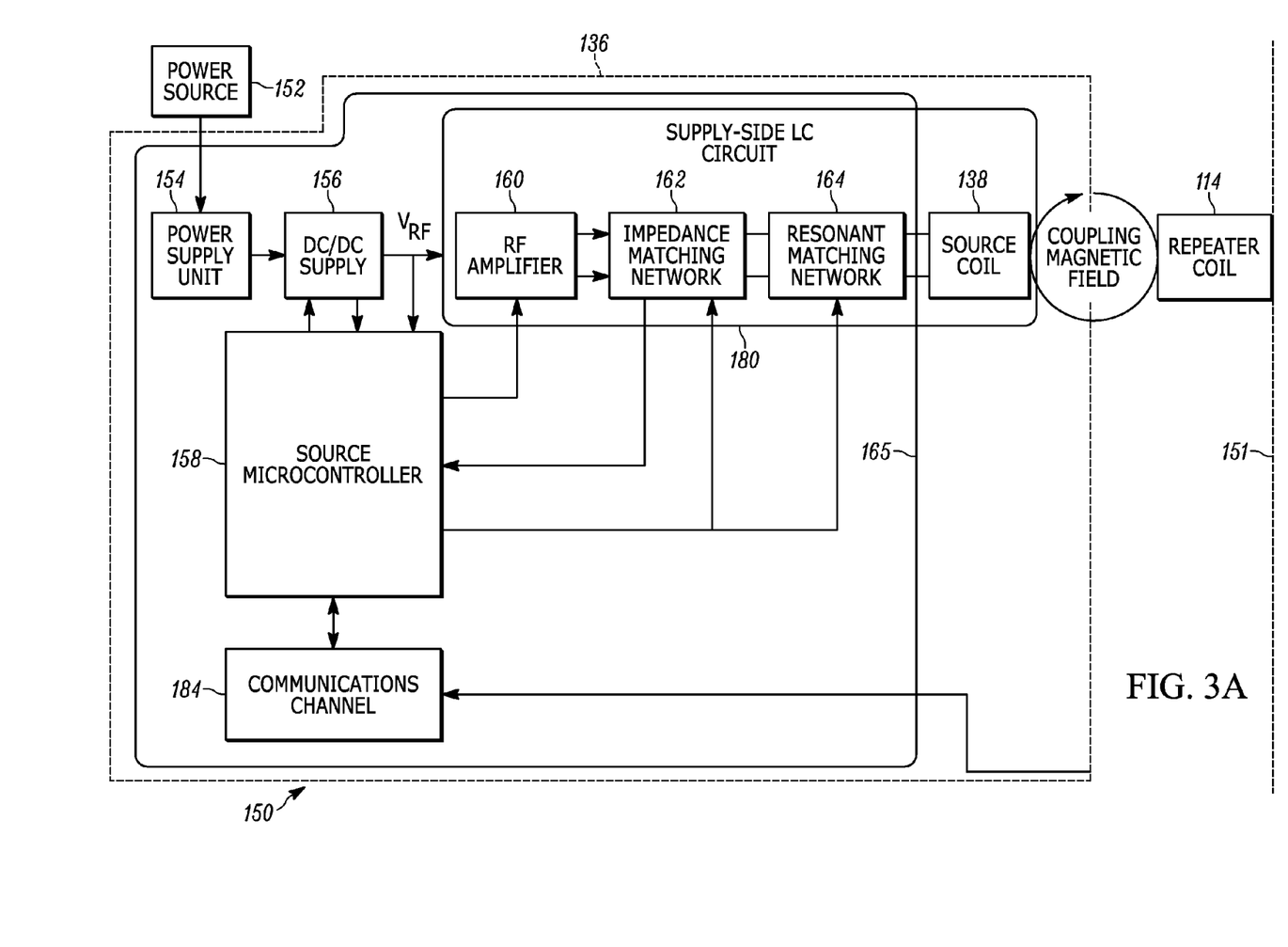
FIGS. 3A and 3B together illustrate a block diagram of a wireless charging system in accordance with some embodiments.
Figure 3B:
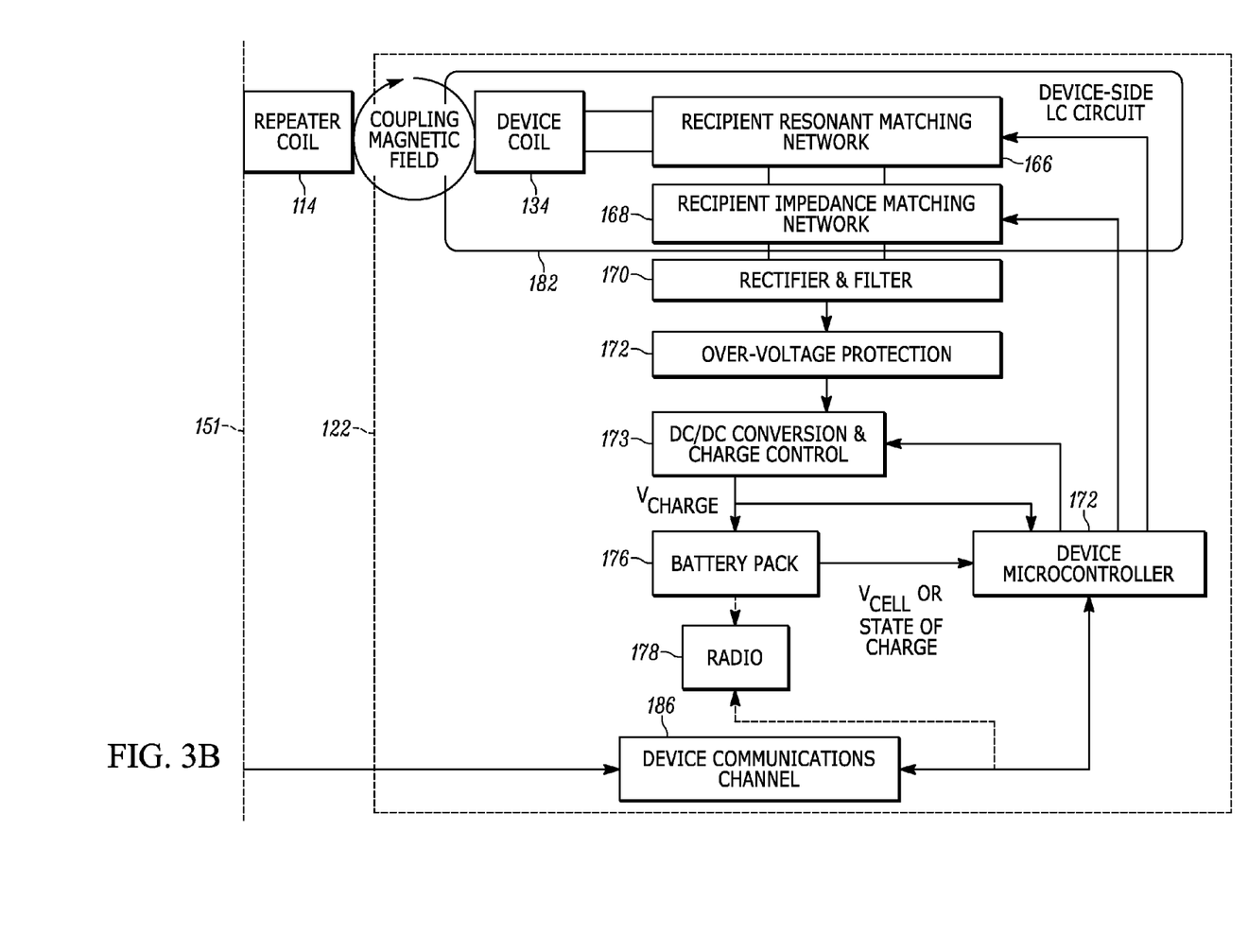

FIGS. 3A and 3B illustrate a schematic diagram of a wireless charging system 150 including the wireless charger 114. This diagram is divided across two sheets by a dashed breaking line 151 such that FIG. 3A illustrates a left portion of the diagram and FIG. 3B illustrates a right portion of the diagram. The wireless charging system 150 includes a power source 152, the power supply circuitry 136, the repeater (charging) coil 130, and the chargeable device 122. The power source 152 is a power supply on-board the vehicle 102, for example a typical 12 volt (V) vehicle battery. In some embodiments, the power source 152 is an energy storage device (battery or capacitor) coupled to and receiving power from photovoltaic cells of the vehicle 102 (e.g., on the roof of the vehicle), from an alternator of the vehicle 102 (e.g., driven by an engine of the vehicle), or from fuel cells. In some instances, the power source 152 is more broadly, the electrical system of a vehicle. In still other instances, for example, with an electric vehicle or hybrid vehicle, the power source 152 is a set of battery cells also used to power an electric motor of the vehicle 102.

The power source 152 outputs direct current (DC) power to the power supply unit 154, which may include a DC filter. The power supply unit 154 receives and filters the input DC power and outputs filtered DC power to the DC/DC supply 156. The DC/DC supply 156 converts the filtered DC power input to one or more different voltage levels for output to the source microcontroller 158 and the push/pull radiofrequency (RF) amplifier 160. The source microcontroller 158 is powered by the output of the DC/DC supply 156, which may be, for example, 3.3 V or 5 V. The source microcontroller 158 also provides control signals to the DC/DC supply 156 to control the DC/DC conversion.

The push/pull RF amplifier 160 receives a DC signal ($V_{RF}$) from the DC/DC supply 156, and the DC signal ($V_{RF}$) is also provided to the source microcontroller 158. The source microcontroller 158 controls the push/pull RF amplifier 160 to output an amplified alternating current (AC) signal. The AC signal output from the push/pull RF amplifier 160 is fed to inputs of an impedance matching network 162. The AC signal passes through the impedance matching network 162, a resonant matching network 164, and then the source coil 138. The elements of the power supply circuitry 136 other than the source coil 138 may be referred to as the coil driving unit 165.

The AC signal received by the source coil 138 is a fluctuating electric current carried by the source coil 138, which produces a changing magnetic field. The changing magnetic field is received by the repeater coil 130, which induces a fluctuating electric current within the repeater coil 130 having the same frequency as the source coil 138. The fluctuating electric current within the repeater coil 130 produces (repeats) the changing magnetic field. The changing magnetic field of the repeater coil 130 induces a fluctuating electric current flow in the device coil 134. This fluctuating electric current induced in the device coil 134 may be referred to as charging current. Accordingly, power is wirelessly transferred from the power supply circuitry 136 to the chargeable device 122 via the repeater coil 130 of the wireless charger 114.

The fluctuating electric current induced in the device coil 134 passes through a recipient resonant matching network 166 and a recipient impedance matching network 168 before being rectified and filtered by the full-wave rectification and filter circuitry 170. A filtered DC signal is output by the circuitry 170 to the over-voltage protection circuit 173, which prevents excess voltage from reaching other circuitry of the chargeable device 122. The DC signal is then received by the DC/DC converter and charge controller 174.

The DC/DC converter and charge controller 174 provides DC charging power ($V_{charge}$) in accordance with control signals received from the device microcontroller 172. The device microcontroller 172 detects the current and voltage level of the DC charging power being provided to the battery pack 176.

The battery pack 176 includes battery cells, battery protection circuitry, and a fuel gauge. The battery pack 176 provides power to the device microcontroller 172 and other circuitry of the chargeable device 122 (e.g., radio 178) to enable the chargeable device 122 to perform its intended functions (e.g., play music, conduct cellular calls, receive and display GPS and map information).

The battery pack 176 outputs the voltage level of one or more of its cells or otherwise provides an indication of the state of charge of the battery pack 176 to the device microcontroller 172. The device microcontroller 172, in turn, controls the DC/DC converter and charge controller 174 to output appropriate DC charging power or to cease outputting DC charging power, for example, when the cells of the battery pack 176 are fully charged. Thus, the fluctuating electric current induced in the device coil 134 is filtered, rectified, and applied to charge the battery pack 176 of the chargeable device 122.

The impedance matching network 162, resonant matching network 164, and source coil 138 form a supply-side, inductive-capacitive resonant (LC) circuit 180 that has a particular impedance ($Z_1$), inductance ($L_1$), capacitance ($C_1$), and resonant frequency ($F_{R1}$). The LC circuit 180 resonates at its resonant frequency ($F_{R1}$) and receives an AC input signal from the push/pull RF amplifier 160. Likewise, the recipient impedance matching network 168, recipient resonant matching network 166, and device coil 134 form a device-side LC circuit 182 having a particular impedance ($Z_2$), inductance ($L_2$), capacitance ($C_2$), and resonant frequency ($F_{R2}$). The resonant frequency ($F_{R1}$) is dependent on the impedance ($Z_1$), inductance ($L_1$), and capacitance ($C_1$), and the resonant frequency ($F_{R2}$) is dependent on the impedance ($Z_2$), inductance ($L_2$) and capacitance ($C_2$).

The source microcontroller 158 detects the impedance of the impedance matching network 162, which effectively represents the impedance ($Z_1$) of the supply-side LC circuit 180. The device microcontroller 172 similarly detects the impedance of the recipient impedance matching network 168, which effectively represents the impedance ($Z_2$) of the device-side LC circuit 182. The source microcontroller 158 is further operable to control the impedance matching network 162 to set the impedance ($Z_1$) and, the resonant matching network 164 to set the resonant frequency ($F_{R1}$), of the supply-side LC circuit 180. The device microcontroller 172 is similarly operable to control the recipient impedance matching network 168 to set the impedance ($Z_2$) and the recipient resonant matching network 166 to set the resonant frequency ($F_{R2}$) of the device-side LC circuit 182.

In one embodiment, the wireless power transmission between the power supply circuitry 136 and chargeable device 122 implements magnetic resonance transmission. In magnetic resonance transmission, the supply-side coil and device-side coil are loosely coupled coils that are driven with a fluctuating electric current at a resonant frequency shared by the supply-side coil and the device-side coil. Driving the supply-side coil and device-side coil at their resonant frequency improves the efficiency of the wireless power transmission and permits transmission at longer distances. For example, the supply-side LC circuit 180 with source coil 138 is driven with an AC signal at its resonant frequency ($F_{R1}$), which generates a changing magnetic field that induces (via the repeater coil 130) the device-side LC circuit 182 with device coil 134 at its resonant frequency ($F_{R2}$), where the resonant frequencies ($F_{R1}$ and $F_{R2}$) are the same. In the system 150, the source microcontroller 158 and the device microcontroller 172 control the impedance matching networks 162 and 168 and the resonant matching networks 164 and 166 such that the supply-side LC circuit 180 and the device-side LC circuit 182 have the same resonant frequencies ($F_{R1}=F_{R2}$), and the source microcontroller 158 controls the push/pull RF amplifier 160 to output an AC signal at the resonant frequency.

In some embodiments, the power supply circuitry 136 and chargeable device 122 each further include a communications channel 184 and a device communications channel 186, respectively. The communications channel 184 is coupled to the source microcontroller 158 and the device communications channel 186 is coupled to the device microcontroller 172. The source microcontroller 158 and the device microcontroller 172 communicate via the communications channel 184 and the device communications channel 186 to agree on a particular resonant frequency. For example, the source microcontroller 158 may request that the device microcontroller 172 configure its device-side LC circuit 182 to have a particular resonant frequency. In turn, the device microcontroller 172 controls the recipient impedance matching network 168 and the recipient resonant matching network 166 to configure such that the device-side LC circuit 182 has the requested resonant frequency. The communications channel 184 and the device communications channel 186 may be, for example, wireless communication units using Bluetooth® communication protocols or wireless local area network (WLAN) products that are based on the Institute of Electrical and Electronics Engineers' (IEEE) 802.11 standards.

Alternatively, the device microcontroller 172 may request that the source microcontroller 158 configure the supply-side LC circuit 180 to have a particular resonant frequency. In turn, the source microcontroller 158 controls the impedance matching network 162 and resonant matching network 164 to configure such that the supply-side LC circuit 180 has the requested resonant frequency, and the source microcontroller 158 controls the push/pull RF amplifier 160 to output an AC signal at the requested resonant frequency.

In some embodiments, the chargeable device 122 does not include the recipient resonant matching network 166 or the recipient impedance matching network 168 such that the resonant frequency ($F_{R2}$) is a predetermined and static characteristic of the supply-side LC circuit 180. The device microcontroller 172 may request that the source microcontroller 158 configure the supply-side LC circuit 180 to have a particular resonant frequency such that the supply-side and device-side LC circuits are in resonance (i.e., $F_{R1}=F_{R2}$). Alternatively, the source microcontroller 158 may obtain the supply-side LC circuit 180 configuration information to set the resonant frequency $F_{R1}$ from the user during a set-up stage or from a memory of the source microcontroller 158 where the information was previously stored and associated with the chargeable device 122.

In some embodiments, a desired resonance frequency is not communicated via the communications channels 184 and 186. Rather, the source microcontroller 158 drives the source coil 138 at the resonant frequency ($F_{R1}$) of the supply-side LC circuit 180 independent of input from the chargeable device 122. For example, in these embodiments, the device microcontroller 172 may be operable to detect the frequency at which the current induced in the device coil 134 is fluctuating. Then, the device microcontroller 172 controls the recipient resonant matching network 166 and the recipient impedance matching network 168 to set the device-side LC circuit 182 to have a resonant frequency ($F_{R2}$) that matches the frequency of the induced current.

In some instances, the impedance matching network 162 and resonant matching network 164 are not included such that the resonant frequency ($F_{R1}$) is a predetermined and static characteristic of the supply-side LC circuit 180. The particular resonant frequency $F_{R1}$ may be communicated to the device microcontroller 172 via the communications channels 184 and 186 or detected by the device microcontroller 172. In turn, the device microcontroller 172 controls the recipient resonant matching network 166 and the recipient impedance matching network 168 to set the device-side LC circuit 182 to have the requested or detected resonant frequency (i.e., $F_{R1}=F_{R2}$)

In still further embodiments, both the power supply circuitry 136 and the chargeable device 122 have resonant frequencies ($F_{R1}$ and $F_{R2}$, respectively) that are predetermined and static characteristics of their respective LC circuits. For example, the resonant frequencies ($F_{R1}$ and $F_{R2}$) may be selected and configured at the time of manufacture.

While the power supply circuitry 136, including the source coil 138, is illustrated and described as being mounted on the roof 139 of the vehicle 102, the power supply circuitry 136 may be positioned in other locations. For example, in some embodiments, the power supply circuitry 136 is mounted to a location on the vehicle 102 other than the visor 104, for example the windshield, in the dashboard, under the seats, in the glove compartment, or in the trunk. Furthermore, in some embodiments, the source coil 138 is positioned separately from or physically independent of one or more of the other components of the power supply circuitry 136, the passenger compartment, or both. For example, the source coil 138 may be mounted on the windshield or roof of the vehicle or otherwise external to the passenger compartment, while the remainder of the power supply circuitry 136 is located in the dashboard and connected via wires to the source coil 138.

In some embodiments, the source coil 138 is positioned on the roof 139 of the vehicle 102 adjacent where the visor face 104a meets the roof 139 when the visor 104 is pivoted closed along the axis 110. In some instances, the source coil 138 is magnetically coupled with the repeater coil 130 when the visor 104 is pivoted closed and the source coil 138 and the repeater coil 130 meet (a closed position), and the source coil 138 and repeater coil 130 are not magnetically coupled when the visor 104 is pivoted downward such that the visor face 104a faces away from the roof 139 and source coil 138 (an open position). In the closed position, the wireless charging system 150 is in a charging mode and a chargeable device 122 is wirelessly charged as described above. In the open position, the wireless charging system 150 is in a viewing mode where the chargeable device 122 is not being charged. In the viewing mode, a display screen of the chargeable device 122 may be at a viewing angle that is satisfactory for a passenger of the vehicle 102, for example generally perpendicular to the roof 139. The wireless charging system 150 may change from the charging mode to the viewing mode as the visor 104 is opened when the source coil 138 and the repeater coil 130 become separated by distance that does not allow for efficient wireless power transfer. Likewise, the wireless charging system 150 may change from the viewing mode to the charging mode as the visor 104 is closed when the source coil 138 and the repeater coil 130 draw near enough to allow for efficient wireless power transfer. In some instances, the source coil 138 is positioned on the windshield of the vehicle 102. Following similar principles as noted above, the wireless charging system 150 enters the charging mode when the visor 104 is fully pivoted open and adjacent the windshield (rather than the roof), and enters the viewing mode when pivoted away from the windshield.

Furthermore, in some embodiments, the power supply circuitry 136 is separate from the vehicle 102. For example, the power supply circuitry 136 is fixed to structural elements of a garage or warehouse near where the vehicle 102 may be parked for extended periods of time, such as over-night. Here, the power source 152 may be an AC mains source (e.g., 120 V/60 hertz (Hz)) of the garage or warehouse (e.g., tied to an AC utility grid). When the power source 152 provides AC power to the power supply circuitry 136, the power supply unit 154 further includes an AC/DC rectifier to convert the received AC power to DC power for the DC/DC supply 156.

In yet further embodiments, the power source 152 is coupled to AC mains, but the power supply circuitry 136 is embedded in a roadway, light post, or other structure along which the vehicles 102 traverses. In these embodiments, many units of the power supply circuitry 136 are dispersed along a roadway (e.g., embedded in the road or in light posts). As the vehicle 102 comes within range of one of the units of the power supply circuitry 136, the associated source coil 138 wirelessly transmits power to the device coil 134 via the repeater coil 130. Thus, the chargeable device 122 is briefly provided charging power from the different units of power supply circuitry 136, one at a time, while they are temporarily within range of the vehicle 102 moving along the roadway.

Figure 4:
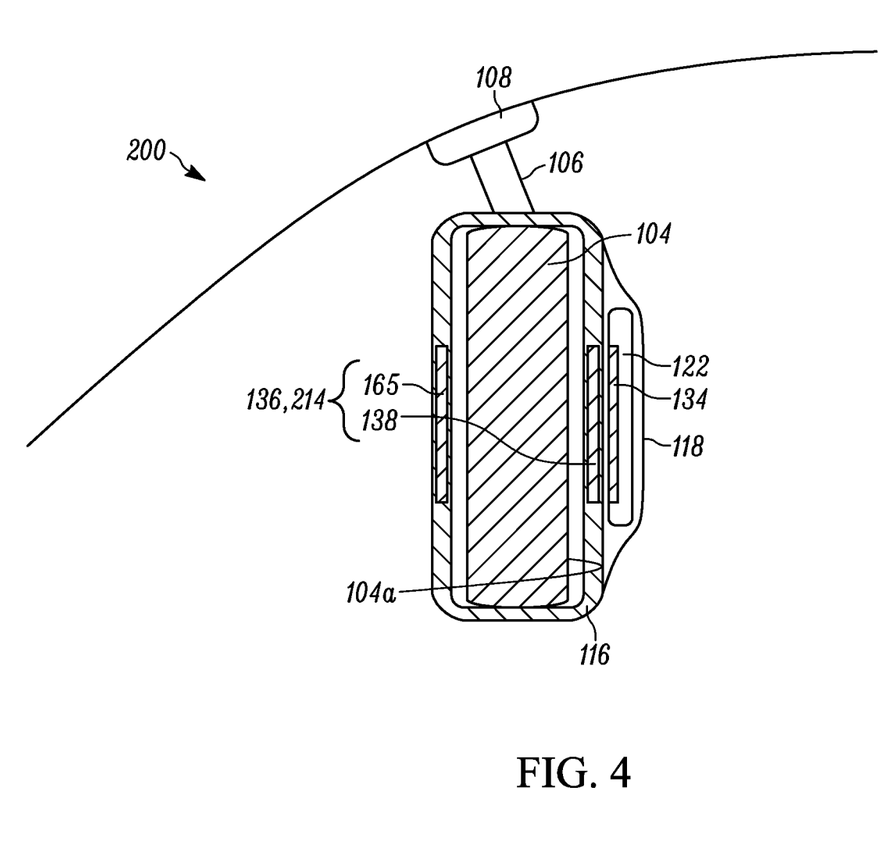
FIG. 4 illustrates another wireless charger in accordance with some embodiments.
Figure 5A:
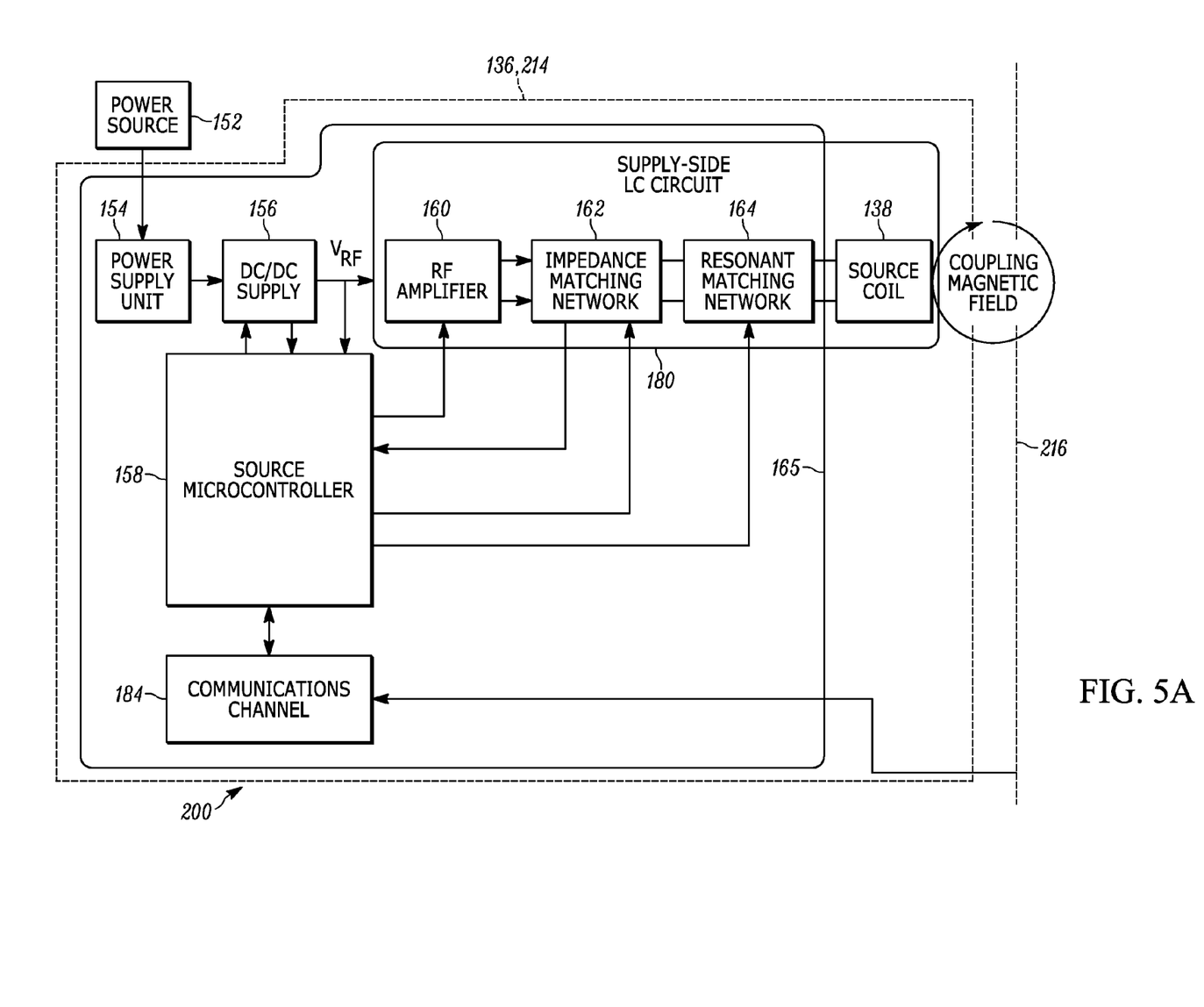
FIGS. 5A and 5B together illustrate an alternate block diagram of a wireless charging system in accordance with some embodiments.
Figure 5B:
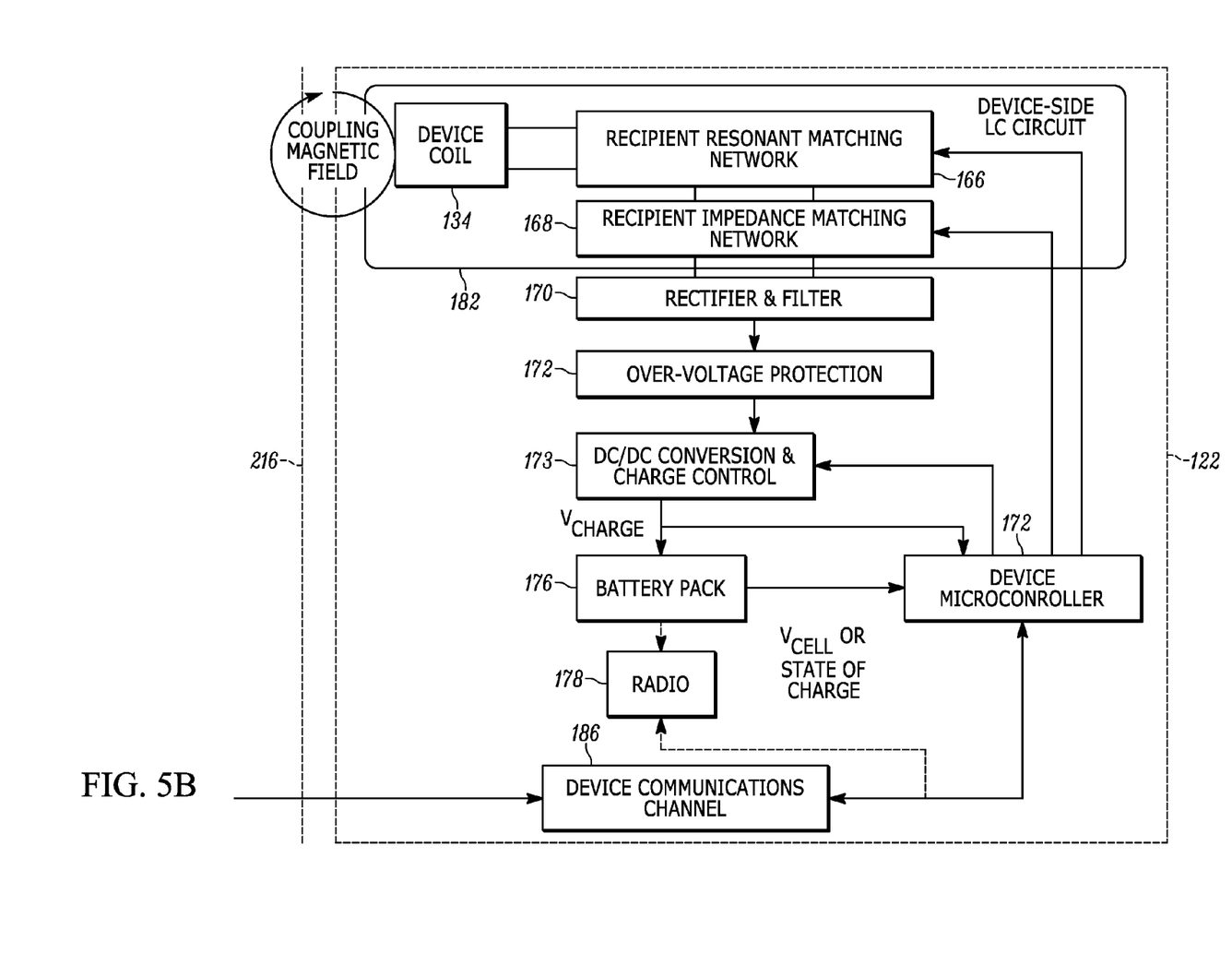

In another embodiment, a wireless charging system 200 including a wireless charger 214 is provided, as illustrated in FIGS. 4, 5A, and 5B. FIGS. 5A and 5B illustrate a schematic diagram of the wireless charging system 200. This diagram is divided across two sheets by a dashed breaking line 216 such that FIG. 5A illustrates a left portion of the diagram and FIG. 5B illustrates a right portion of the diagram. Like numbered components between the wireless charging systems 150 and 200 have similar functionality and the descriptions thereof are not repeated for the wireless charging system 200. The wireless charging system 200 is generally similar to the wireless charging system 150 except that (1) the source coil 138 and device coil 134 are magnetically coupled directly, rather than via a repeater coil, and (2) the power supply circuitry 136 is provided as part of the wireless charger 214 and within the sleeve 116.

With respect to the first difference, FIGS. 5A and 5B illustrate the source coil 138 coupling magnetically with the device coil 134 without a repeater coil 130 in between. In this scenario, the source coil 138 is also referred to as a charging coil. The wireless charging system 200 wirelessly charges the chargeable device 122 using magnetic resonance transmission between the power supply circuitry 136 and chargeable device 122. The wireless charging system 200 achieves magnetic resonance transmission using similar techniques as described above with respect to the wireless charging system 150. Here, the power supply circuitry 136 may be referred to as a wireless power transmitter.

With respect to the second difference, FIG. 4 illustrates the source coil 138 and the coil driving unit 165 of the power supply circuitry 136 positioned on the visor 104. More particularly, the source coil 138 is positioned on a first side of the visor 104 with the pocket 118, while the coil driving unit 165 is positioned on a second, opposite side of the visor 104. The coil driving unit 165 includes the components of the power supply circuitry 136 other than the source coil 138, for example the power supply unit 154, DC/DC supply 156, push/pull RF amplifier 160, impedance matching network 162, resonant matching network 164, source microcontroller 158, and communications channel 184. The source coil 138 and the coil driving unit 165 are coupled together via wires (not shown) that extend around the visor 104 through the sleeve 116. In some embodiments of the wireless charging system 200, the power source 152 may be coupled to the power supply unit 154 through power wires that extend through a cavity or hollow portion of the arm 106.

The source coil 138 in the system 200 is a flat-wound coil with a generally planar form, like the repeater coil 130. Also like the repeater coil 130, the source coil 138 includes a first planar side facing the visor 104 and a second planar side facing the chargeable device 122.

Figure 6A:
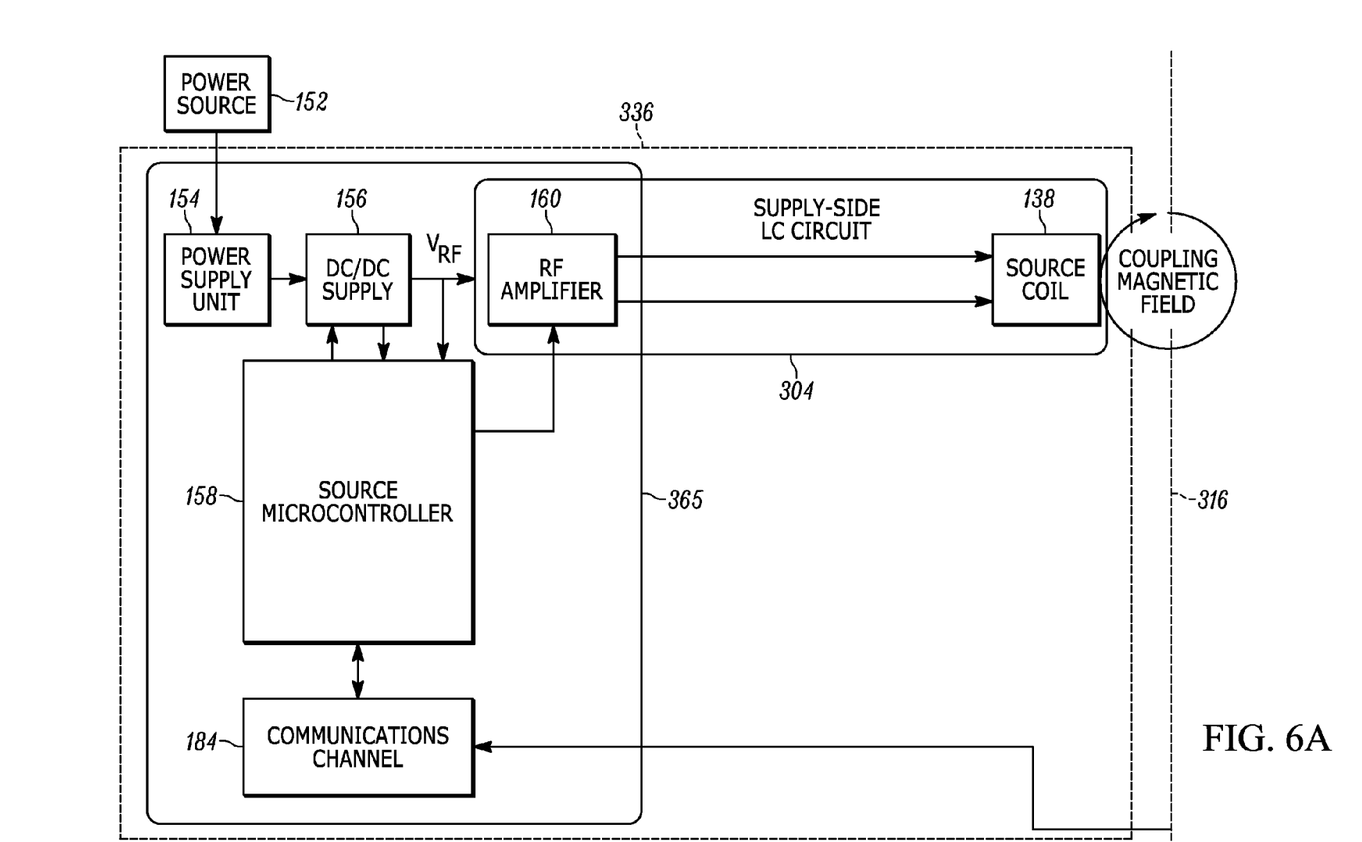
FIGS. 6A and 6B together illustrate an alternate block diagram of a wireless charging system in accordance with some embodiments.
Figure 6B:
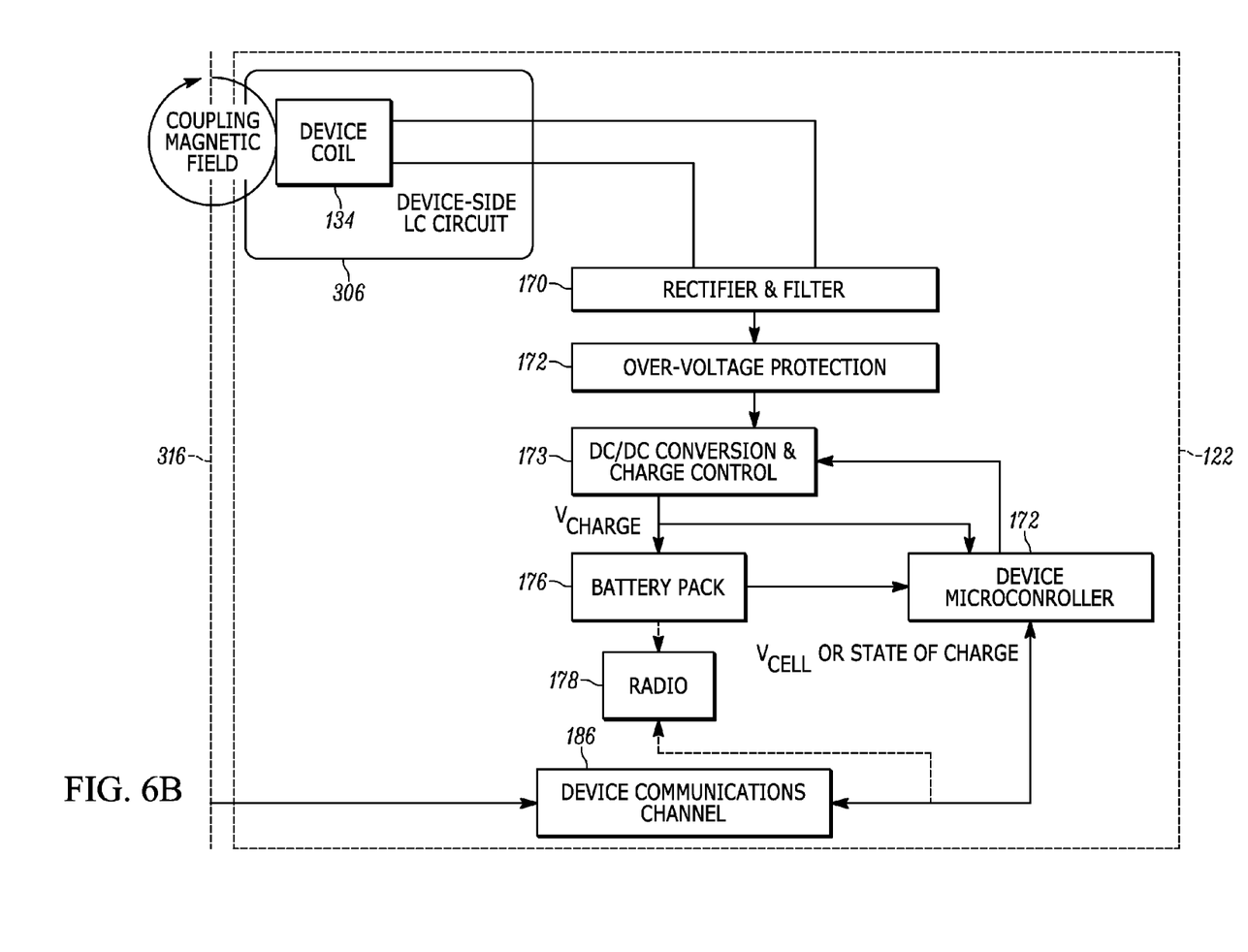

In another embodiment, a wireless charging system 300 including a wireless charger 314 is provided as illustrated in the diagram of FIGS. 6A and 6B. This diagram is divided across two sheets by a dashed breaking line 316 such that FIG. 6A illustrates a left portion of the diagram and FIG. 6B illustrates a right portion of the diagram. Like numbered components between the wireless charging system 300 and the wireless charging systems 150 and 200 have similar functionality and the descriptions thereof are not repeated for the wireless charging system 300. The wireless charging system 300 is generally similar to the wireless charging system 200, except that the system uses inductive power charging rather than magnetic resonance charging. In inductive power charging, the source coil 138 and device coil 134 are tightly coupled and do not operate a resonance frequencies of their respective LC circuits. The tightly coupled source coil 138 and device coil 134 are generally planar, have similar size diameters, have a distance between them that is substantially less than the diameter of the coils 134 and 138, and are part of respective LC circuits that operate at non-resonant frequencies. Generally, when the device coil 134 and source coil 138 are in magnetic resonance as described above for charging systems 150 and 200, the coils 134 and 138 are loosely coupled. The loosely coupled coils 134 and 138 have one or both of differently sized diameters and a distance between them that is similar to or greater than the diameter of the coils 134 and 138.

The wireless charging system 300 includes power supply circuitry 336 including a coil driving unit 365 and the source coil 138. The power supply circuitry 336 may be referred to as a wireless power transmitter. As noted above, the tightly coupled source coil 138 and device coil 134 do not operate at resonant frequency of the supply-side LC circuit 304 and the device-side LC circuit 306, respectively. Accordingly, in contrast to the power supply circuitry 136, the power supply circuitry 336 does not include the impedance matching network or resonant matching network components like the wireless charging systems 150 and 200.

In the wireless charging system 300, the power supply circuitry 336 and the chargeable device 122 communicate via the communications channels 184 and 186. For example, the chargeable device 122 is operable to request that the power supply circuitry 336 begin providing charging power via the source coil 138 and request that the power supply circuitry 336 cease providing charging power, e.g., when the battery pack 176 is fully charged. In some embodiments, the communications channels 184 and 186 are not included in the wireless charging system 300.

The wireless charging system 300 is positioned on the visor 104 similar to the wireless charging system 200 shown in FIG. 4. More particularly, the source coil 138 is positioned on a first side of the visor 104 with the pocket 118, while the coil driving unit 365 is positioned on a second, opposite side of the visor 104. The source coil 138 and coil driving unit 365 are coupled together via wires that extend around the visor 104 through the sleeve 116. In some embodiments of the wireless charging system 300, the power source 152 may be coupled to the power supply unit 154 through power wires that extend through a hollow portion of the arm 106.

Figure 7A:
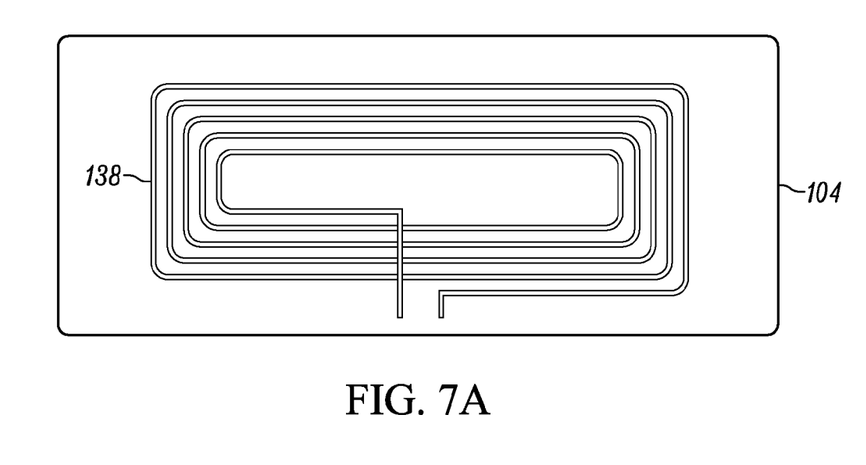
FIGS. 7A and 7B illustrate coil layouts for a visor in accordance with some embodiments.
Figure 7B:
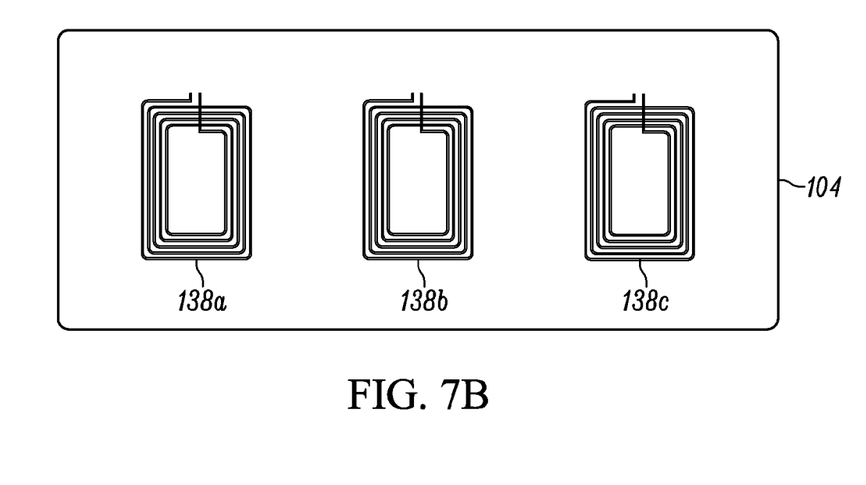

FIGS. 7A and 7B illustrate various configurations for the source coil 138 on the visor 104, each shown as a flat-wound coil. FIG. 7A illustrates the source coil 138 as a single coil having a similar shape as the visor 104—rectangular with rounded edges. While the wireless charging systems 150, 200, and 300 have been described as having a single source coil 138, in some embodiments, one or more of the wireless charging systems 150, 200, and 300 include additional source coils 138 to enable charging of multiple chargeable devices 122 (one coil per device). For example, FIG. 7B illustrates three source coils 138a, 138b, and 138c, which may be part the wireless charging systems 150, 200, or 300. Each source coil 138a-c is part of a separate supply-side LC circuit. In the case of the magnetic resonance configuration, each source coil 138a-c is coupled to a separate push/pull RF amplifier 160, an impedance matching network 162, and a resonant matching network 164, and is driven independently by the source microcontroller 158. Thus, up to three different chargeable devices 122 may be charged, each at a different resonant frequency. The different configurations of the source coil 138, 138a, 138b, and 138c in FIGS. 7A and 7B may also be used as configurations for the repeater coil 130 (e.g., in the system 150).

In other embodiments, one or more of the wireless charging systems 150, 200, and 300 include a connector having a different form than the sleeve 116. For example, the wireless charging systems 150, 200, and 300 include a panel having the associated wireless chargers 114, 214, and 314 therein or thereon, and the panel clips on to the visor 104 using a spring-based clip and/or the panel includes one or more straps that can be tightened and secured around the visor 104. In addition, the wireless chargers 114, 214, and 314 may be removably connected or secured by using, for example, a hook-and-loop fastening connector or fastener, for example a VELCRO fastener.

In still further embodiments, one or more of the wireless chargers 114, 214, and 314 are embedded into the visor 104 and, therefore, are connected to the visor internally. Thus, in these embodiments, the visor 104 includes the wireless charger 114, 214, or 314.

The pocket 118 may be a solid fabric or may include mesh netting. In some instances, the pocket 118 includes a transparent panel so that a display screen of the chargeable device 122 is viewable when it is within the pocket 118. In other embodiments, the device retainer of the wireless chargers 114, 214, and 314 takes a different form than the pocket 118. For example, one or more of the wireless chargers 114, 214, and 314 may include a panel with a recess to receive the chargeable device 122, a spring-based clip to receive and secure the chargeable device 122, or a hook and fastener element to attach to a reciprocal hook and fastener element of the chargeable device 122.

In some embodiments, one or more of the wireless chargers 114, 214, and 314 also include an electro-mechanical connector dock or another wired connection port or connector cable (e.g., a universal serial bus (USB)® port or cable) for connecting a chargeable device 122 via a wired connection. The chargeable device 122 or an alternative chargeable device (e.g., one without a device coil 134) is able to receive charging power via the wired connector dock, connector port, or connector cable in these embodiments.

Figure 8:
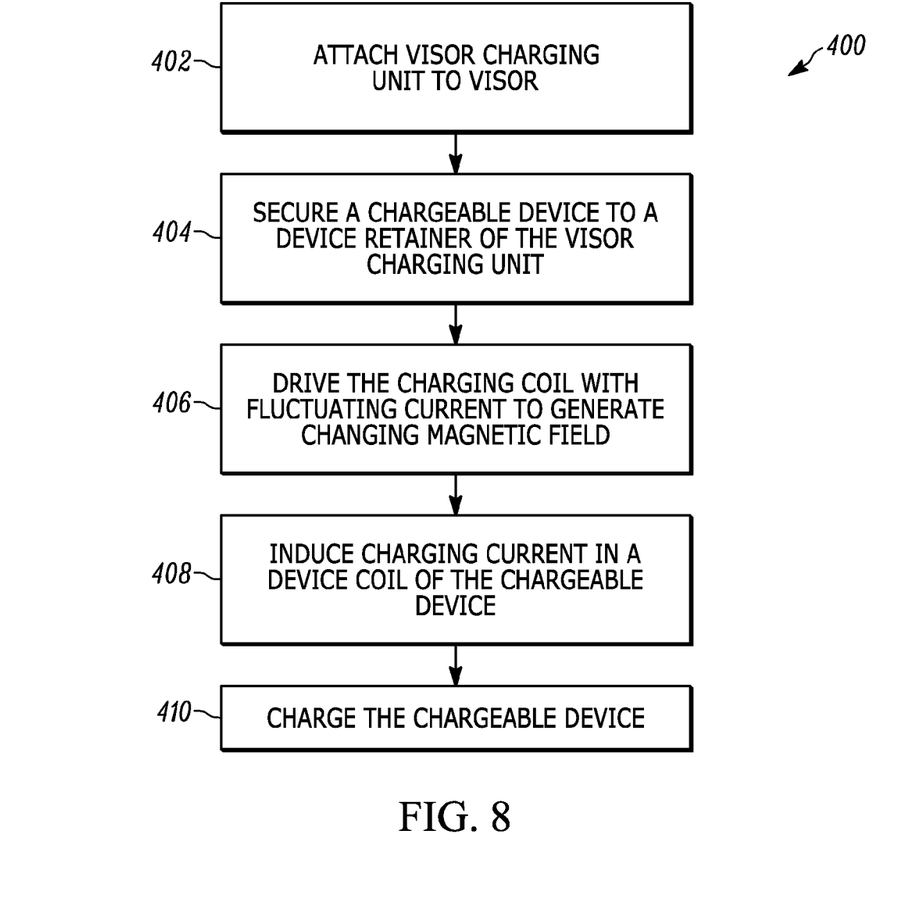
FIG. 8 is a flowchart of a method of wireless charging in accordance with some embodiments.

FIG. 8 illustrates a flow chart 400 of wirelessly charging a chargeable device. The flow chart 400 is described with respect to embodiments of the wireless charging systems 150, 200, and 300 described above; however, the flow chart 400 may also be implemented using other wireless charging systems. In step 402, one of the wireless chargers 114, 214, or 314 is attached to the visor 104 in a passenger compartment 100 of a vehicle 102 via a connector, for example the sleeve 116. In step 404, the chargeable device 122 is secured to the device retainer (e.g., pocket 118) of the visor charting unit. For example, the chargeable device 122 is inserted into the pocket 118. The pocket 118 may be positioned on the sleeve 116 such that the device coil 134 of the chargeable device 122 lines up and is facing the charging coil on the visor (e.g., the repeater coil 130 or source coil 138).

In step 406, the charging coil is driven with fluctuating electric current to thereby generate a changing magnetic field. For example, in embodiments with the source coil 138 as the charging coil (see FIGS. 5A-B and 6A-B), the coil driving unit 165 or 365 drives the charging coil to generate a changing magnetic field. That is, the coil driving unit 165 or 365 receives power from a power input and outputs a fluctuating electric current derived therefrom to the charging coil (the source coil 138). Alternatively, in embodiments with the repeater coil 130 as the charging coil (see, e.g., FIGS. 3A and 3B), the source coil 138 produces a changing magnetic field that is received by the repeater coil 130 to drive the repeater coil 130 with a fluctuating electric current, which thereby generates a changing magnetic field.

In step 408, the changing magnetic field generated in step 406 by the charging coil is received by the device coil 134 of the chargeable device 122, which induces a fluctuating electric current in the device coil 134. In step 410, the induced fluctuating current, also referred to as charging current, is used by the chargeable device 122 to charge a battery pack thereof (e.g., battery pack 176).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless charger comprising:
   a sleeve configured to secure the wireless charger to a visor of a passenger compartment of a vehicle, the sleeve configured to slide over the visor;
   a retainer configured to selectively retain a chargeable device with respect to the visor and having a recipient coil such that the chargeable device is selectively and temporarily fixed to the sleeve; and
   a wireless power transmitter including a charging coil carrying a fluctuating electric current that generates a changing magnetic field for receipt by the recipient coil of the chargeable device
   wherein the charging coil is a repeater coil that is magnetically coupled to a source coil, and wherein the source coil is electrically coupled to a power source of the vehicle and is located on the vehicle in a location other than the visor.

2. The wireless charger as claimed in claim 1, wherein the sleeve is configured to removably secure the wireless charger to the visor.

3. The wireless charger of claim 1, wherein the charging coil is a repeater coil that is magnetically coupled to a source coil, and wherein the source coil is physically independent of and external to the passenger compartment.

4. The wireless charger of claim 1, wherein the charging coil is a flat-wound coil having a first planar side facing the visor and a second planar side facing away from the visor and toward the retainer.

5. The wireless charger of claim 1, wherein the charging coil and the recipient coil are tightly coupled.

6. The wireless charger of claim 1, further comprising:
   a power input; and
   a coil driving unit coupled to and receiving power from the power input and having an output, wherein the coil driving unit outputs the fluctuating electric current derived from the power received from the power input,
wherein the charging coil of the wireless power transmitter is coupled to the output of the coil driving unit to receive the fluctuating electric current.

7. The wireless charger claim 6, wherein the power input is coupled to power wires that extend through a cavity in an arm of the visor, the power wires electrically coupled to a power source of the vehicle.

8. The wireless charger of claim 1, further comprising:
a power input; and
a coil driving unit coupled to and receiving power from the power input and having an output,
wherein the coil driving unit outputs the fluctuating electric current derived from the power received from the power input, and the power input is coupled to a power source and the power source includes one selected from the group of a photovoltaic cell, a fuel cell, a vehicle battery, and a vehicle electrical system.

9. The wireless charger claim 8, wherein the coil driving unit includes an impedance matching network and a resonant matching network in communication with a controller, and the charging coil, the impedance matching network, and the resonant matching network form a supply-side LC circuit that resonates at a resonant frequency shared by a device-side LC circuit that includes the recipient coil.

10. The wireless charger claim 1, further comprising:
a second retainer configured to selectively retain a second chargeable device having a second recipient coil; and
a second charging coil configured to have a second fluctuating electric current that generates a second changing magnetic field for receipt by the second recipient coil of the second chargeable device.

11. A method of wireless charging:
attaching a wireless charger to a visor in a passenger compartment of a vehicle via a sleeve configured to slide over the visor;
securing a chargeable device to a retainer of the wireless charger, thereby securing the chargeable device to the visor coil such that the chargeable device is selectively and temporarily fixed to the sleeve;
driving a charging coil with fluctuating electric current to thereby generate a changing magnetic field, wherein the charging coil is a repeater coil and driving the charging coil with fluctuating electric current includes receiving, by the charging coil, the changing magnetic field from a source coil;
inducing, by the changing magnetic field, a charging current in a recipient coil of the chargeable device;
charging the chargeable device using the charging current; and
electrically coupling the source coil to a power source of the vehicle and positioning the source coil on the vehicle in a location other than the visor.

12. The method of claim 11, wherein the charging coil is flat wound such that the charging coil has a planar form with a first planar side and a second planar side opposite the first planar side, and wherein attaching the wireless charger to the visor includes positioning the charging coil such that the first planar side faces the visor and the second planar side faces away from the visor.

13. The method of claim 11, further comprising
loosely coupling the charging coil and the recipient coil and transmitting power from the charging coil to the recipient coil via magnetic resonance,
or
tightly coupling the charging coil and the recipient coil by at least positioning the recipient coil within a distance of the charging coil that is less than a diameter of the charging coil and the recipient coil.

14. The method of claim 11, wherein driving the charging coil with fluctuating electric current includes:
receiving, by a coil driving unit, power from a power input;
outputting the fluctuating electric current, by the coil driving unit, derived from the power received from the power input; and
receiving, by the charging coil, the fluctuating electric current from the coil driving unit.

15. The method of claim 14, wherein receiving, by the coil driving unit, power from the power input includes receiving power from a power source of the vehicle via power wires that extend through a cavity in an arm of the visor and that are electrically coupled to the power input.

16. The method of claim 14, further comprising:
controlling an impedance matching network and a resonant matching network, with a controller, to set a resonant frequency of a supply-side LC circuit including the charging coil such that it matches the resonant frequency of a device-side LC circuit including the recipient coil; and
transmitting power from the charging coil to the recipient coil via magnetic resonance.

17. The method of claim 11, further comprising:
securing a second chargeable device to a second retainer of the wireless charger;
driving a second charging coil with second fluctuating electric current to thereby generate a second changing magnetic field;
inducing, by the second changing magnetic field, charging current in a second recipient coil of the second chargeable device; and
charging the second chargeable device using the charging current induced in the second recipient coil.

* * * * *